May 8, 1923.
K. W. POLLARD
1,454,688
HOLDING, ADJUSTING, AND ALIGNING APPARATUS FOR LENSES FOR EYEGLASSES AND THE LIKE
Filed Nov. 25, 1921
2 Sheets-Sheet 2
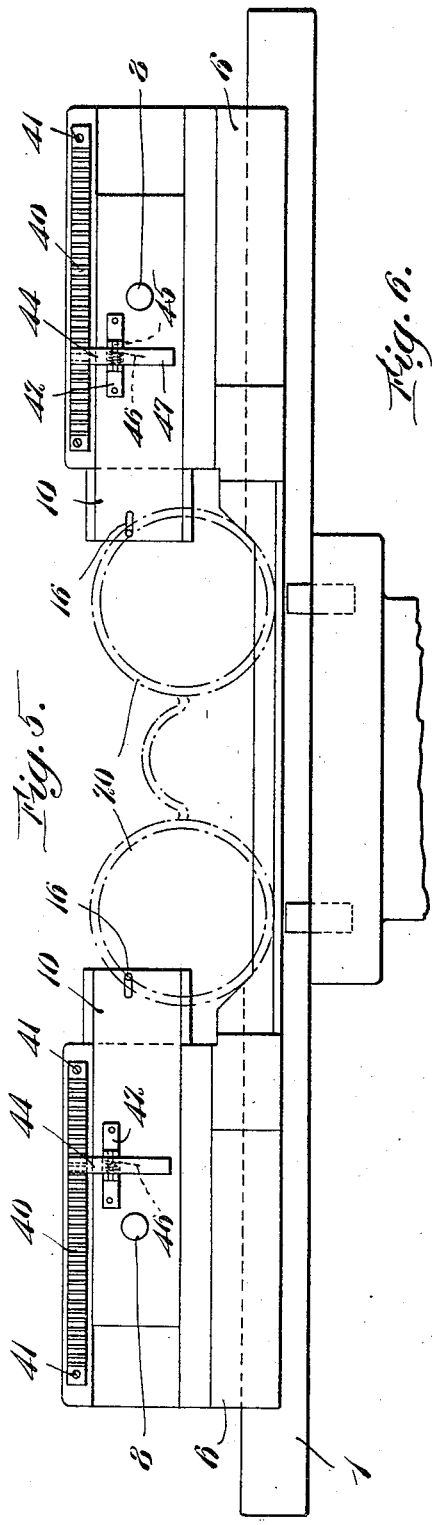
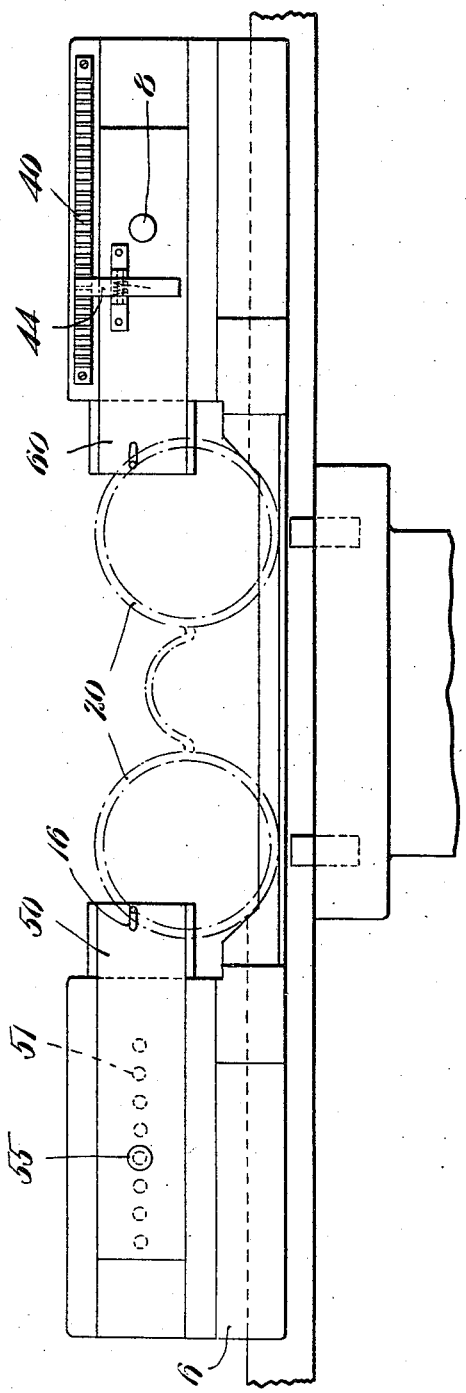

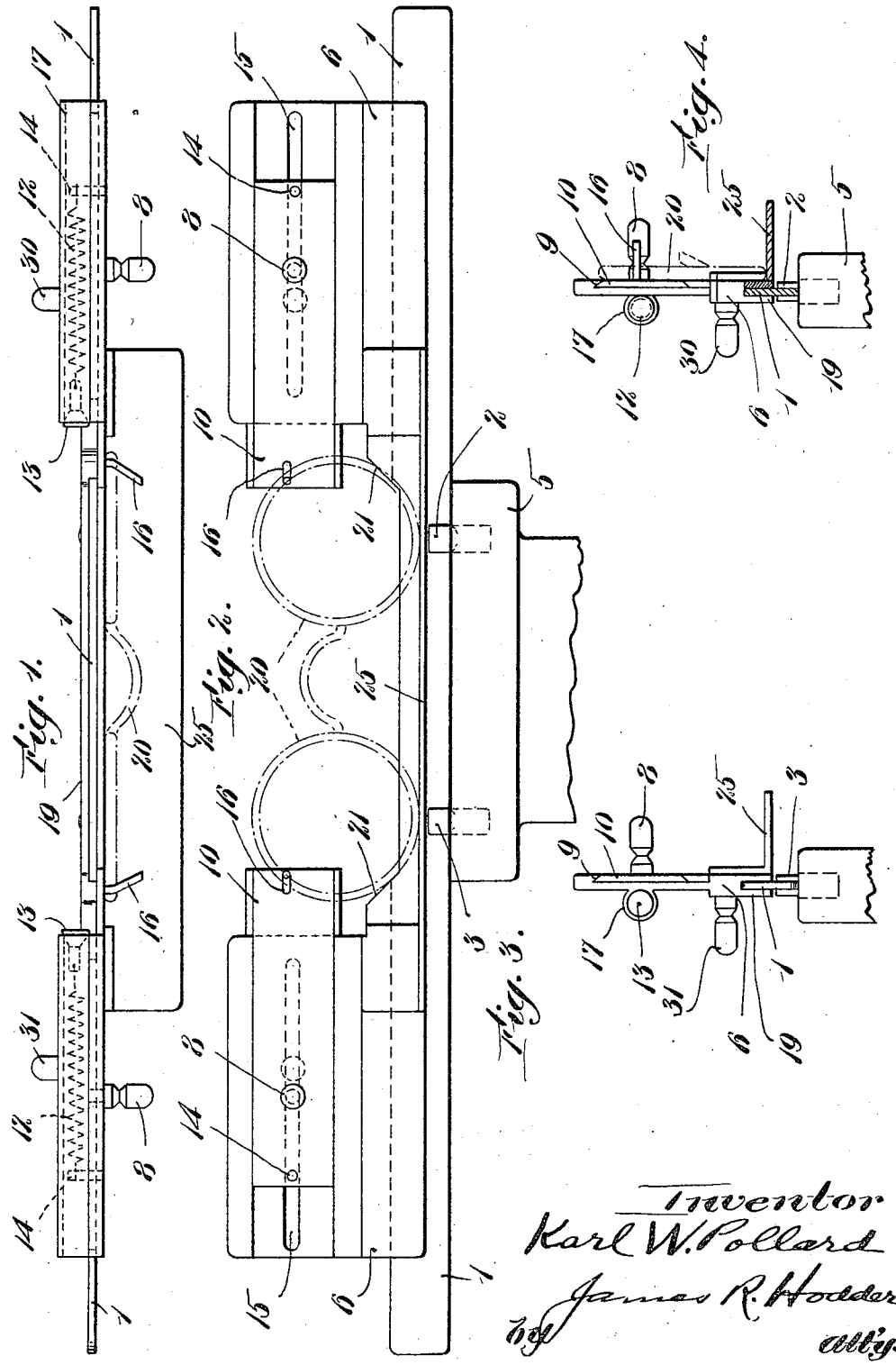

Patented May 8, 1923.

1,454,688

UNITED STATES PATENT OFFICE.

KARL W. POLLARD, OF BOSTON, MASSACHUSETTS.

HOLDING, ADJUSTING, AND ALIGNING APPARATUS FOR LENSES FOR EYEGLASSES AND THE LIKE.

Application filed November 25, 1921. Serial No. 517,834.

*To all whom it may concern:*

Be it known that I, KARL W. POLLARD, a citizen of the United States, and resident of Boston, in the county of Suffolk and State of Massachusetts, have invented an Improvement in Holding, Adjusting, and Aligning Apparatus for Lenses for Eyeglasses and the like, of which the following description, in connection with the accompanying drawings, is a specification, like letters on the drawings representing like parts.

My present invention is an improved and novel apparatus adapted to hold, center and aline articles, such for example as lenses, or a pair of lenses, for eyeglasses and the like, and to permit adjustment of the articles while so held.

In optical work, it is necessary to test and focus the lenses, and heretofore it has been customary to position a single lens into a frame in fixed relation to the aligning and testing instrument. This prior method was slow and objectionable because of the necessity of handling each lens independently, and furthermore no means for lateral movement and adjustment was permitted. In the case of a pair of glasses or lenses it was, of course, necessary in prior practice to remove each lens or to put each lens in separately for the aligning and testing action. My present invention obviates the difficulties above noted and provides means which will automatically hold and center, as well as retain in position, a plurality of lenses, such for example as a completed pair of glasses, and then permit quick and immediate adjustment for alinement and testing with each lens, and while the plurality of lenses, pair of glasses or the like is still held in position. By this invention, I am able to greatly speed up this work, and also to provide an apparatus which will permit of a very considerable range in adjustability, as distinguished from prior holders which were in fixed relation with the testing instrument. Preferably I arrange an attachable member capable of being positioned into any desired testing instrument, and so construct the holding and adjustable members that a pair of glasses can be fitted almost instantly onto the apparatus, yielding members will act to center and hold the same, and then these holding members will be automatically maintained in position, during the entire movement and adjustment of the frame for testing and focusing first one lens and then another, while the movable holder will readily permit removal of the pair of glasses at any point throughout the range of the movement permitted.

Further features of the invention, novel combinations and advantages will be hereinafter pointed out and claimed.

Referring to the drawings, illustrating a preferred embodiment of the invention, Fig. 1 is a plan view of my apparatus;

Fig. 2 is a vertical view of the apparatus as it would be held in position on or in a testing instrument;

Fig. 3 is an end view;

Fig. 4 is a sectional view;

Fig. 5 illustrates a modification;

Fig. 6 illustrates a still further modification.

As shown in the drawings, my apparatus is primarily intended to hold a pair of glasses in assembled position, although any plurality can be so applied and the apparatus can be used for other work.

A vertical extending rib or track 1, is provided preferably with a pair of studs 2 and 3 at suitable spaced intervals which may be, and preferably are, adapted to fit within corresponding recesses in the worktable 5 of an adjusting and focusing instrument, to which the apparatus is intended to be applied. This track 1 is of suitable length to carry a pair of slides 6, 6, each slide being formed with a slot adapted to fit over the upper portion of the track 1 and to slide throughout the length thereof. Each slide is provided with a finger operating member 8, 8, by which it may be slid back and forth, and carries in its upper portion an undercut groove 9, in which groove is fitted a supplemental slide 10, in each member 6. These members 10 are also adapted to slide, being normally impelled toward each other by coiled springs 12, 12, said springs having one end secured to an adjusting screw 13 and the other end to a post 14, said post being attached to each slide 10 and extending through a slot 15 in the upper part of each slide 10, while the adjusting screws 13 are secured to the open end of a tube 17 carried by the upper portion of said slide 6 and enclosing said springs. Each slide 10 is also provided at its forward end with a glass engaging hook or member 16, in position to fit above a horizontal line passing through the centers of the glasses to be applied therein—such glasses being illustrated in dotted lines at 20, and the lower parts of such glasses resting upon inclined faces 21 on the inner ends of the slide 6. A platform 25 on which the bottom of the glasses may rest, is also provided, and unites the two slides 6, 6, and also the continuous portion 19 at the rear of the track 1. Thus, the glasses 20 may be positioned on the platform 25 and the slides 10 each moved outwardly against the tension of their respective springs 12 to permit the glasses to be fitted in position, whereupon, by releasing the knobs 8, the springs 12 force the slides 10 inwardly until the hooks 16 contact with the upper part of the rim of each glass. In this manner the glasses are centered and held under yielding but firm tension on the apparatus, between the pairs of beveled faces 21 and the hooks 16, as clearly shown in Figs. 1 and 2.

Thus a considerable range for work is provided, and both slides 6 and the topmost sliding members 10 are all held in yielding contact against the pair of glasses 20 while the entire apparatus can be moved longitudinally on the track 1 by the operator during the positioning of first one lens for testing and focusing and then the immediate shifting of the device by sliding same longitudinally to aline, test and focus the other lens.

Thereupon the glasses are removed by the operator moving one of the handles 8 and removing the tension of the slide 10 and hook 16 against the glasses to release the same. To facilitate this movement of the slide 10 by the handle 8, when sliding the entire apparatus, I provide lugs 30 and 31 at the back of the slide, as a finger grip or fulcrum, to permit movement of the slides 10 independently of moving the entire apparatus.

The slides 10 are limited in their sliding action by the length of the slot 15 through which the pin 14 passes, limiting each member 10 in its respective slide 6 for a predetermined length of longitudinal movement. While my apparatus is intended primarily to hold a pair of glasses, as illustrated and described yet it is feasible to utilize the same to hold, retain and test a single glass, and thereby to perform these functions when a single independent lens is to be tested. For this purpose the opposite pairs of slides 6 are simply allowed to come close together, with the upper members 10 and engaging hooks 16 in contact with the top of one slide, by increasing the length of the slots 15. Thus I have a wide range of uses, and furthermore with the glasses so held they can be positioned off center if desired, as the foci is strictly eccentric, whereas this capability was impossible with the prior fixed holders. The entire apparatus can be attached to and detached from a testing instrument and furthermore can be made attachable to any desired form of testing device.

While I prefer to utilize a pair of springs or the like to impel, in a yielding manner, the slides 10 toward each other, I may modify this construction as illustrated in Figs. 5 and 6. Thus in Fig. 5 for example, the slides 10, 10, instead of being yieldingly moved toward each other, may be positively moved by the hand of the operator on the handle 8 and then locked in position. For this purpose I attach a rack 40 at the upper top portion of each member 6, which rack may be secured by a pair of screws or bolts 41, 41, and I mount upon the slide in an appropriate position, approximately midway thereof, a bracket 42 secured to the slide and carrying a pivoted lever 44. This lever is preferably pivoted on a rod or shaft 45, carried by the bracket 42 and with a spring, shown in dotted lines 46, so arranged as to normally impel the lever 44 with its upper portion adapted to engage with or between the teeth on the rack 40. Thus the operator by depressing the lower portion 47 of the lever 44, releases the same from the rack 40 and then moves the slide 10 into desired glass holding position or release therefrom. The slide will thus be positively locked and held in any position to which it is moved.

In Fig. 6 a still further modification is illustrated, wherein one side may be rigidly fixed and the entire range of adjustment desired effected by the other side. Thus the slide 50 at the left viewing Fig. 6, may be set or adjusted in a fixed position. I prefer to form a plurality of recesses indicated in dotted lines at 51 through the back of the member 6, and with a spring pressed plunger or the like 55 which may also be the handle to move or actuate the slide 50, I may thus lock and hold the slide 50 permanently in any position, while still permitting adjustment. Then the entire range of movement to hold the spectacles, glasses or the like 20 is effected by the movement of the slide 60 at the right. A rack 40 and lever 44 as just described may be utilized for this purpose, or the spring 12 and arrangement as explained in Fig. 1 may be employed. With the glasses once positioned the entire apparatus is then operated as has been already described.

My invention is further described and defined in the form of claims as follows:

1. Adjusting devices for a pair of lenses, while mounted in a frame comprising a slide adapted to be fitted to a lens aligning and testing instrument, means to hold said frame and lenses, in combination with means permitting the adjustment of each lens in said aligning and testing at the will of the operator.

2. Apparatus of the kind described, having means for adjustment and to maintain the same in adjusted position for holding articles of varying proportions, such as spectacles, glasses, lenses or the like, having a sliding member, guiding and holding means mounted at one side of said member and adjustable cooperating guiding and holding means mounted at the other side of said member.

3. A slide to hold a lens, comprising a pair of movable members mounted at opposite portions of said slide, means permitting the movement of one or both of said members toward each other, to engage and hold the lens, and means to positively lock said sliding members in adjusted position.

4. A slide to hold a lens, comprising a pair of movable members mounted at opposite portions of said slide, means permitting the movement of one of said members, to engage and hold the lens, and means to positively lock said sliding member in adjusted position.

In testimony whereof, I have signed my name to this specification.

KARL W. POLLARD. [L. S.]